Patented Aug. 11, 1931

1,818,898

UNITED STATES PATENT OFFICE

WERNER LANGE, OF DESSAU-ZIEBIGK IN ANHALT, GERMANY, ASSIGNOR TO GENERAL ANILINE WORKS, INC., OF NEW YORK, N. Y., A CORPORATION OF DELAWARE

DIRECT AZO DYES

No Drawing. Application filed October 3, 1929, Serial No. 397,154, and in Germany October 10, 1928.

My present invention relates to new azo-dyes and to a process of manufacturing them. One of its objects is to provide direct dyes for cotton and pigments, which are fast to the action of light and to washing.

The new dyes correspond probably to the general formula

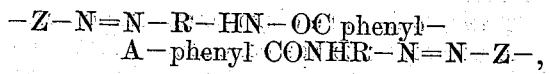

wherein the Z's represent the residues of any azo component, R represents a radicle of the group consisting of benzene-, naphthaline-, diphenyl-, stilbene- and diphenylurea- radicles and of a plurality of benzoylamino compounds of one of these radicles, linked together by an atomic linkage of the group consisting of the azo- and the azoxy group, and A represents an atomic linkage of the group consisting of

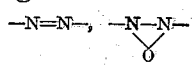

I have found that new dyes of the said qualities are obtainable by diazotizing a compound which corresponds to the general formula

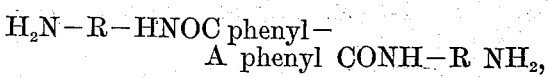

wherein R represents a radicle of the group consisting of benzene-, napthalene-, diphenyl-, stilbene- and diphenyl urea- radicles and of a plurality of benzoylamino compounds of one of these radicles, linked together by an atomic linkage of the group consisting of the azo- and azoxy group, and A represents a group consisting of the azo- or azoxy-group, and by coupling the bis-diazo- compound, thus obtained, with any azo component.

The starting material represented by the formula given above is obtainable, for instance, by a slight reduction of a nitrobenzoy- lated aromatic amino compound containing in its molecule the atomic group

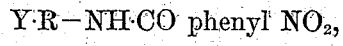

wherein R' represents an aromatic radicle and Y stands for a substituent of the group consisting of $NO_2$, $NH_2$, $NH$—$CO$—alkyl, $NH$—$CO$—aryl, $NH$—$CO$—aryl—$NO_2$. Water soluble dyestuffs are obtained, when starting from a corresponding compound, in which the aromatic residue is substituted by a sulfonic acid or carboxylic acid group.

The manufacture of these starting materials is not claimed in the present invention; it is the subject matter of U. S. application Ser. No. 340,654, filed by me and G. Kalischer as joint inventors on February 16, 1929.

The following examples serve to illustrate my invention without limiting it to the specific details given therein, the parts being by weight:—

*Example 1.*—36.7 parts of sodium-1-amino-4-(4'-nitrobenzoylamino)-benzene-2-sulfonate of the formula

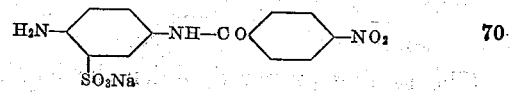

are dissolved in 1000 parts of water. At a temperature of 20° C. a solution containing 4 parts of sodium hydroxide and 7.8 parts of anhydrous sodium sulfide is added, and the mixture is stirred until the sulfide has disappeared. The yellow compound which has separated is filtered off and purified by dissolving in water and reprecipitating.

32.7 parts of the product thus obtained are dissolved in 1000 parts of water. To the solution are added successively 6.9 parts of sodium nitrite and 50 parts of hydrochloric acid of 12° Bé. The mixture is stirred for some hours at a temperature of about 20° C. until the diazotation is complete. Then a solution of 25.4 parts of 1-sulfophenyl-3-methyl-5-pyrazolone cooled by addition of ice and alkaline by the presence of sodium carbonate is added.

The dye is finished in the usual manner. It forms in the dry state a yellowish powder which is soluble in water; from an aqueous solution cotton is dyed directly in clear golden-yellow tints of an excellent fastness to the action of light.

Dyestuffs of similar qualities are obtained when starting from a compound which is prepared by a slight reduction of 1-amino-4 (4'-nitrobenzoylamino)-benzene-2-sulfonate with, for instance, glucose, arsenious oxide or zinc dust.

The dyestuff probably corresponds to the formula

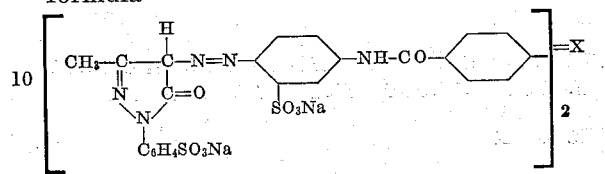

X represents either the azo group —N=N— or the azoxy group

a definite formula cannot be given, because it is uncertain, if by the slight reduction of the nitrobenzoyl compound, two molecules are linked together by the —N=N— or by the

group.

*Example 2.*—For the sodium 1-amino-4 (4'-nitrobenzoylamino) benzene-2-sulfonate used in Example 1 is substituted an equivalent quantity of the sodium salt of mono (p-nitrobenzoyl)-4, 4'-diaminodiphenyl urea 3, 3'-disulfonic acid of the formula

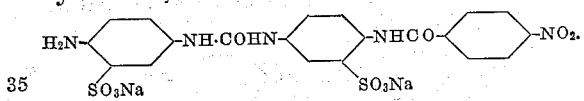

The azodye prepared under the conditions given in Example 1 from the product obtainable by a slight reduction of this nitrobenzoyl compound has similar qualities as that described in the foregoing example. This dye probably corresponds to the general formula

*Example 3.*—48.6 parts of 1.4-di-(4'-nitrobenzoylamino)-benzene-2-sulfonic acid of the formula

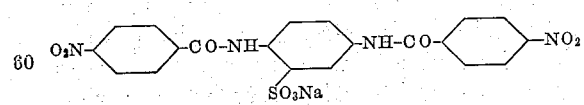

are introduced, while stirring, into a hot mixture of 500 parts of water, 33 parts of zinc dust and 10 parts of glacial acetic acid, and the mass is then boiled for 5–10 minutes. The mixture is then diluted with 700 parts of water and made slightly alkaline with 12 parts of sodium carbonate. From the solution freed from zinc oxide the product separates on cooling.

A solution of 44.6 parts of the product thus obtained is prepared by heating with 1500 parts of water. After cooling to 20° C., 6.9 parts of sodium nitrite and 50 parts of hydrochloric acid of 12° Bé. are added and the mixture is stirred for some hours. The diazotization finished, a cold solution of 25.4 parts of 1-sulfophenyl-3-methyl-5-pyrazolone which is made alkaline by the addition of sodium carbonate is added to the diazocompound. The dyestuff thus obtained is finished in the usual manner. It has qualities similar to that obtainable according to Example 1; cotton is directly dyed from an aqueous solution in somewhat greener shades.

*Example 4.*—The diazo-compound obtainable according to the conditions mentioned in Example 3 is reacted upon a cold solution of 17.7 parts of the anilide of acetoacetic acid which is alkaline by the presence of sodium carbonate. The dyestuff is finished in the usual manner, filtered off and pressed. Preferably it is worked up to form a paste. In this manner a beautiful yellow pigment is obtained.

Corresponding dyes are obtainable by coupling the diazo-compound with other azo-components which provide yellow dyestuffs, as for instance phenylmethyl-pyrazolone, dihydroxyquinoline, α-methylindole.

*Example 5.*—The diazo-compound obtainable according to the details given in Example 3 is allowed to run into a solution of 38 parts of 2-(meta-amino-benzoylamino)-5-

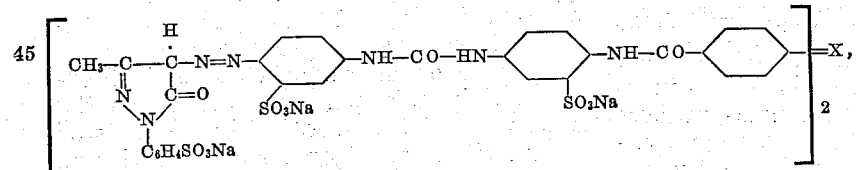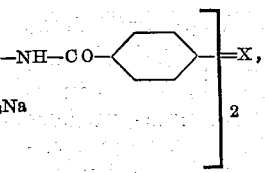

wherein X may be the group —N=N— or

naphthol-7-sulfonic acid which is alkaline by the presence of sodium carbonate.

The dyestuff is finished in the usual manner, it forms in the dry state a red powder, an aqueous solution of it dyes cotton directly with orange-red shades which may be diazotized on the fiber and coupled with phenylmethylpyrazolone or β-naphthol, whereby the tints become fast to washing without altering essentially the original shade.

I cannot give an exact formula of the dyestuffs obtainable according to Examples 3–5, because it is uncertain how many molecules of the starting material are linked together by the reduction process. Probably, these dyes may be represented by the following general formula

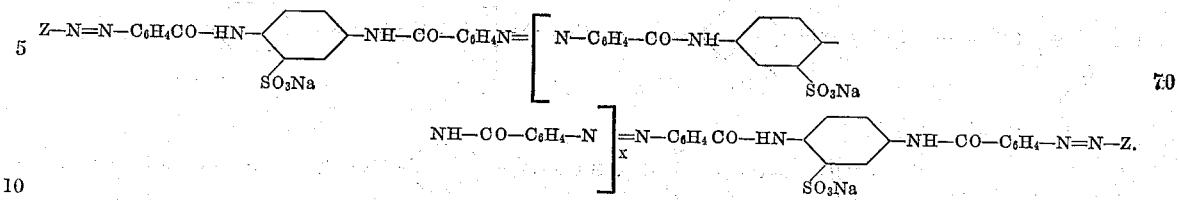

In this formula Z is the azo component; in the dye obtainable according to Example 3 it represents 1-sulfo-phenyl-3-methyl-5-pyrazolone, in the dye corresponding to Example 4 it represents the anilide of acetoacetic acid, in the dye of Example 5 it is 2(meta-aminobenzoyl-amino)-5-naphthol-7-sulfonic acid. As mentioned above, I am not sure whether the products obtained by the slight reduction of the nitrobenzoylamino compound are linked together by the azo or the azoxy group. For the sake of greater clearness in the formula given above, I have inserted the azo group, however, it may be the azoxy group. Furthermore, I do not know certainly how many molecules of the starting material are linked together by the slight reduction process. $x$ therefore represents 0 or a whole number 1, 2, or, perhaps, a whole number greater than 3.

What I claim is:—

1. The new azo dyes corresponding to the general formula:

Z—N=N—R—HN.OC phenyl-A-phenyl—CO—NH—R—N=N—Z, wherein the Z's represent the residues of any azo component, R represents a radicle of the group consisting of benzene-, naphthalene-, diphenyl-, stilbene- and diphenylurea radicles and of a plurality of benzoylamino compounds of one of these radicles, linked together by an atomic linkage of the group consisting of the azo- and the azoxy group, and; A represents an atomic linkage of the group consisting of

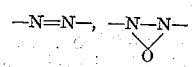

2. The new direct azo dyes for cotton corresponding to the general formula:

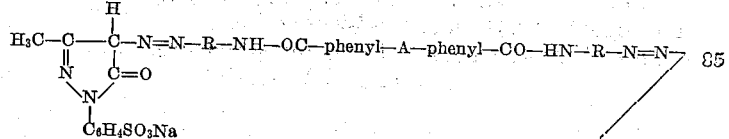

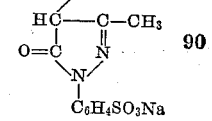

wherein R represents a radicle of the group consisting of benzene-, naphthalene-, diphenyl-, stilbene- and diphenyl-urea- radicles and of a plurality of benzoylamino compounds of one of these radicles, linked together by an atomic linkage of the group consisting of the azo- and azoxy group, and A represents an atomic linkage of the group consisting of $-N=N-$,

3. The new direct azo dyes for cotton corresponding to the general formula:

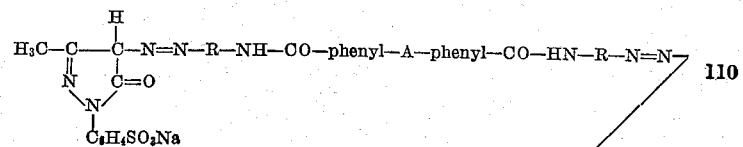

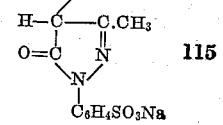

wherein R represents a radicle of the group consisting of the benzene radicle and a plurality of benzoylamino benzene compounds linked together by an atomic linkage of the group consisting of the azo- and azoxy group, and A represents an atomic linkage of the group consisting of $-N=N-$,

4. The new dye, soluble in water and dyeing cotton directly in yellow shades of excellent fastness to light and to washing and corresponding probably to the formula:
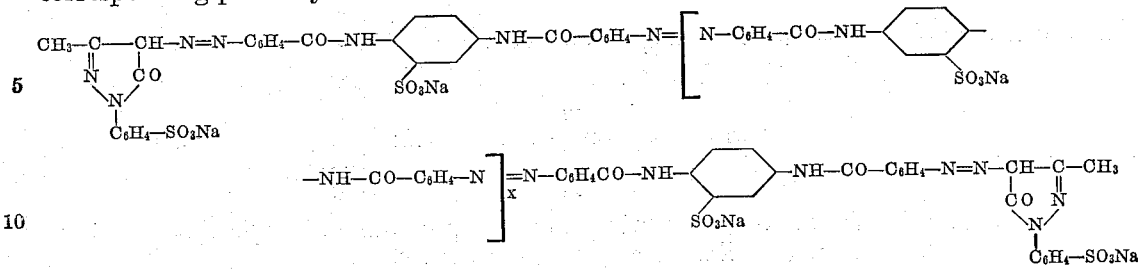
$x$ meaning 0 or a whole number 1, 2, or 3, this dye being obtainable by a slight reduction of 1, 4-di(4′-nitrobenzoylamino)-benzene-2-sulfonic acid, by diazotizing the product obtained, and by coupling it with 1-(sulfophenyl)-3-methyl-5-pyrazolone.
In testimony whereof, I affix my signature.
WERNER LANGE.